C. C. RINEHARDT.
CORN HARVESTING MACHINE.
APPLICATION FILED JULY 21, 1917.

1,308,643.

Patented July 1, 1919.
5 SHEETS—SHEET 3.

Inventor
Carlton C. Rinehardt
By
C. F. Belt
Atty.

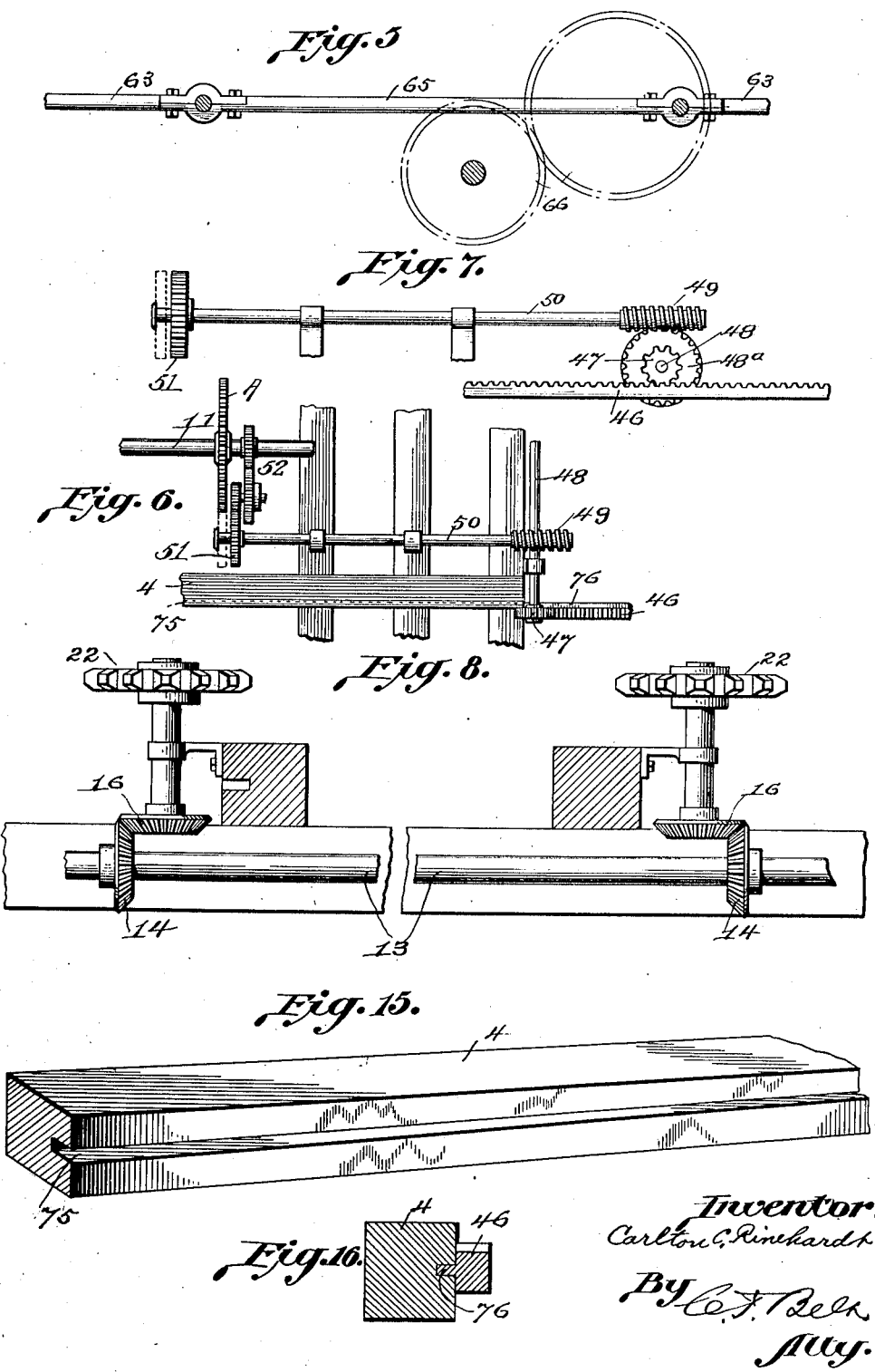

C. C. RINEHARDT.
CORN HARVESTING MACHINE.
APPLICATION FILED JULY 21, 1917.
1,308,643.
Patented July 1, 1919.
5 SHEETS—SHEET 5.
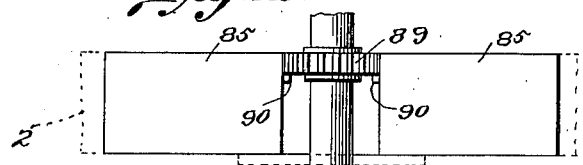
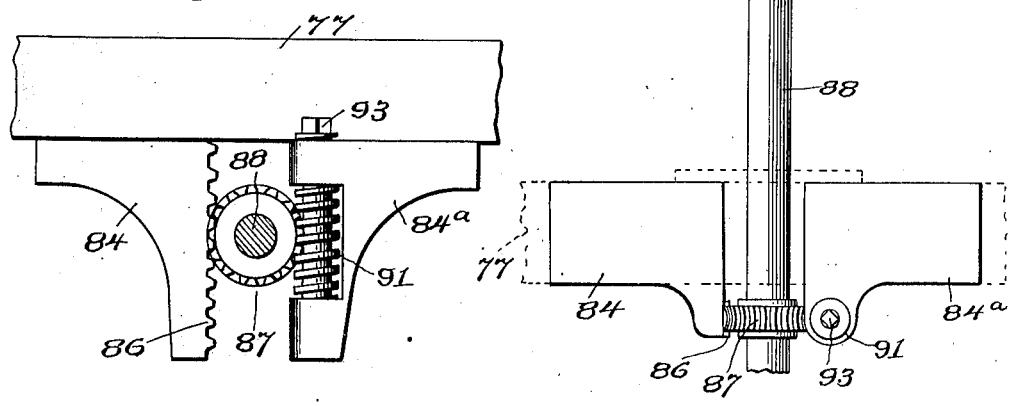
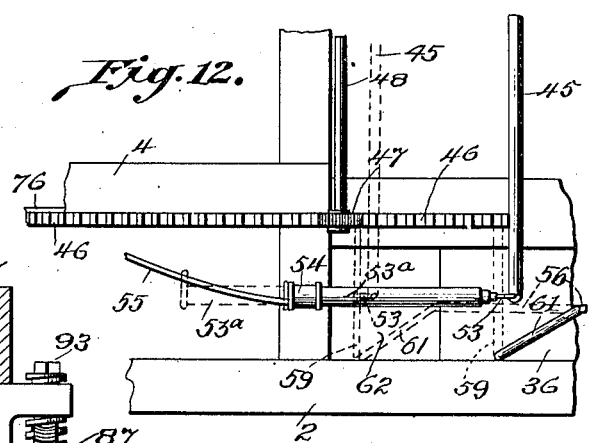

UNITED STATES PATENT OFFICE.

CARLTON C. RINEHARDT, OF LOVELAND, OHIO.

CORN-HARVESTING MACHINE.

1,308,643. Specification of Letters Patent. Patented July 1, 1919.

Application filed July 21, 1917. Serial No. 182,023.

*To all whom it may concern:*

Be it known that I, CARLTON C. RINE-HARDT, a citizen of the United States, residing at Loveland, in the county of Hamilton and State of Ohio, have invented certain new and useful Improvements in Corn-Harvesting Machines, of which the following is a specification.

This invention relates to corn harvesters, and pertains especially to a self-propelled or motor driven corn harvesting machine embodying various improvements for cutting two rows of corn, and various novel and peculiar devices and coöperating combinations for collecting, assembling, shocking and delivering the corn during the travel of the machine.

The object of the invention is to provide a motor driven traction machine of such special construction and arrangement of parts as to afford means for transmitting the motor power to various parts of the machine so that such parts may be operated in unison for corn cutting, conveying, assembling, shocking and dropping the shocks between the rows from which the cutting is made.

A further object of the invention is to provide in a motor driven corn harvesting machine, adapted to be propelled between two adjacent rows of corn, novel and peculiar mechanism operated by the propelling motor for reciprocating a cutter bar in simultaneously cutting two rows of corn, and to furnish novel and peculiar mechanism for guiding and conveying the corn from the cutters to the rear platforms of the machine for shocking and dropping.

A still further object of the invention is to provide a shocking table composed of a plurality of shutters operated by mechanism connected with a hand lever for opening and closing the shutters, and to furnish a special shocking device reciprocated lengthwise over the table by mechanism driven by the propelling motor.

A still further object of the invention is to provide novel and peculiar mechanism in connection with the rear axle of the machine for raising and lowering the rear wheels, or the machine on said axle, as desired or as occasion may demand.

Various other objects, advantages and improved results in corn harvesting are attainable by reason of the construction, relative arrangement and combination of the various parts and their coöperation, as will hereinafter appear.

In the accompanying drawings forming part of this application:—

Fig. 5 is a detail front view of the mechanism for operating the cutter bar.

Fig. 6 is a detail top view, partly broken away, of the mechanism for operating the traveling racks and their connections.

Fig. 7 is a side elevation of part of the mechanism shown in Fig 6.

Fig. 8 is a detail elevation of a portion of the cross shaft, showing one set of its gears and pinions.

Fig. 9 is a detail side view of the mechanism for raising and lowering the rear wheels.

Fig. 10 is a top view of the mechanism shown in Fig. 9 with the bracket beams in dotted lines.

Fig. 11 is a cross section of one pair of bracket beams showing an axle and its brackets in elevation.

Fig. 12 is a detail top view of a portion of the front end of one of the side raceways showing the crowding bar and the telescoping rods in retracted position.

Fig. 14 is a detail elevation of the central portion of the cross shaft.

Fig. 15 is a detail perspective view of a portion of one of the grooved frames.

Fig. 16 is a cross section of a grooved frame portion and a rack bar.

The same reference characters denote the same parts throughout the several views of the drawings.

Figure 1:
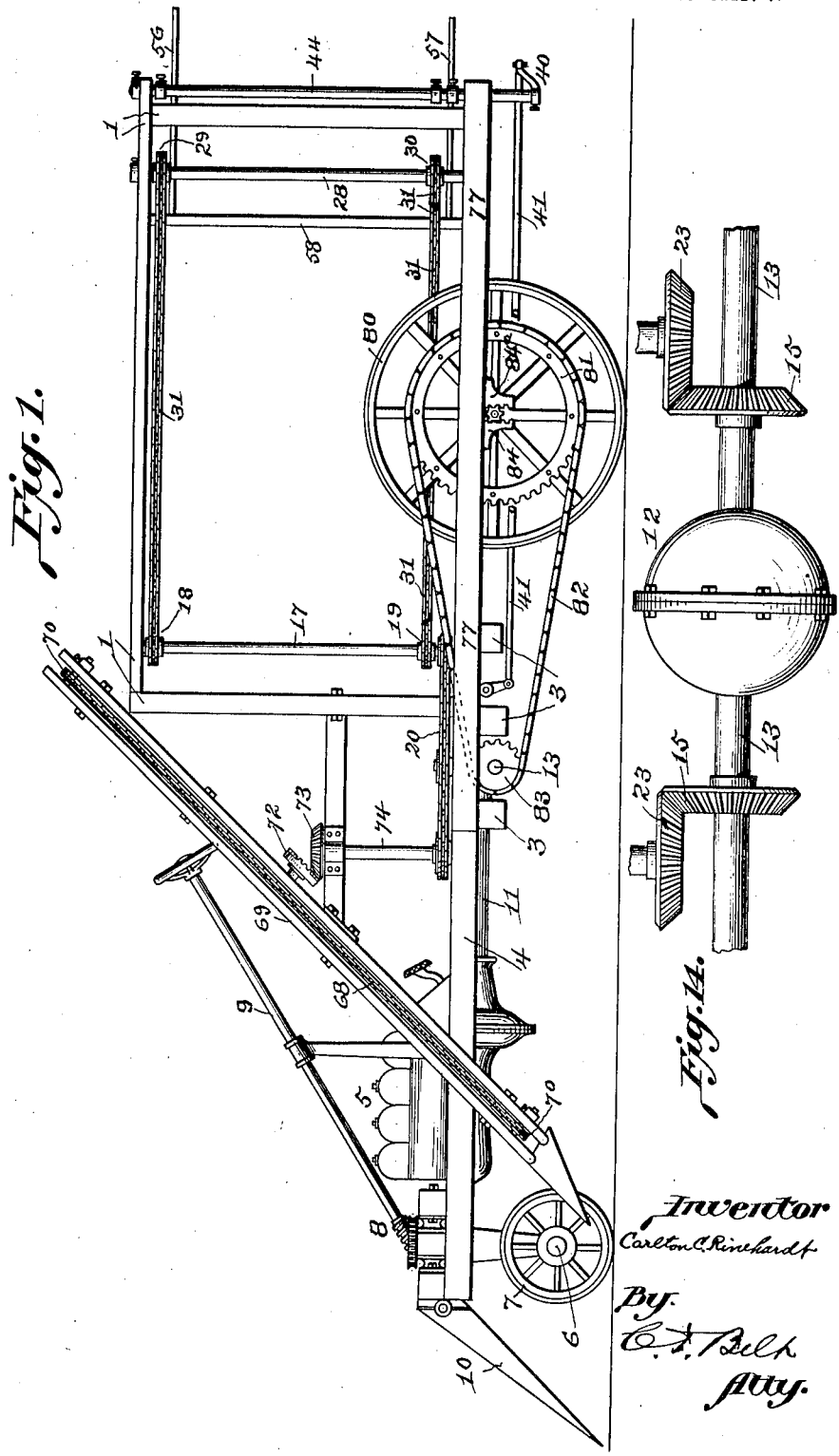
Figure 1 is a side elevation of the machine, with the outer side sprockets and chains broken away.
Figure 2:
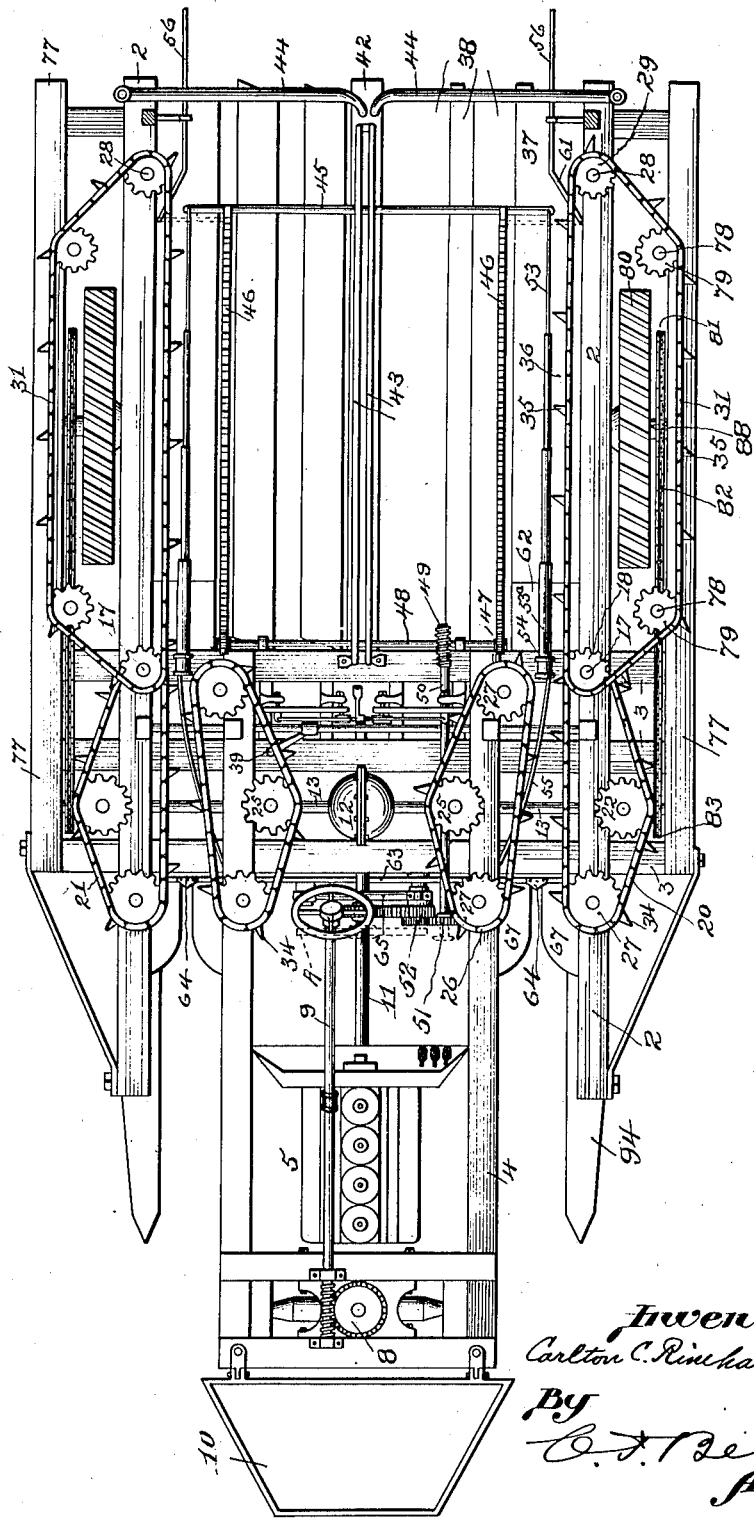
Fig. 2 is a top plan view.
Figure 3:
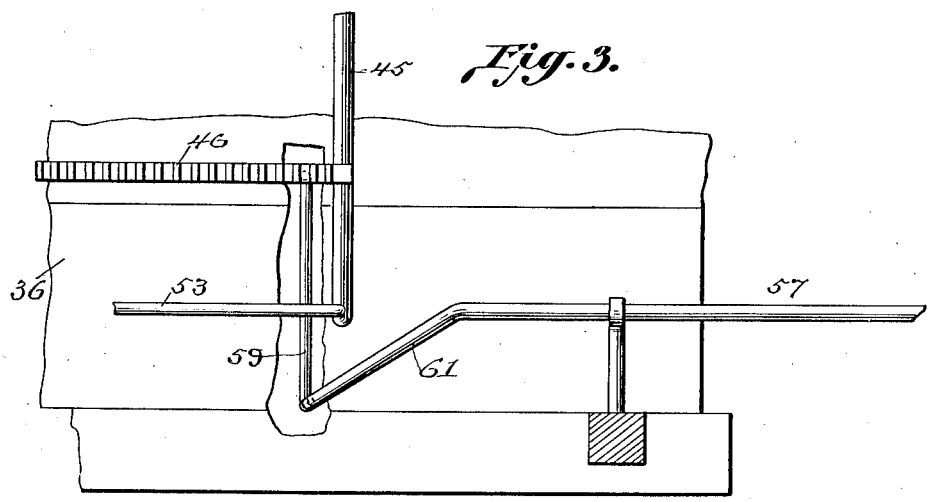
Fig. 3 is a detail top view of one of the angle arms of the crowding bars and mechanism for operating the same, partly broken away.
Figure 13:
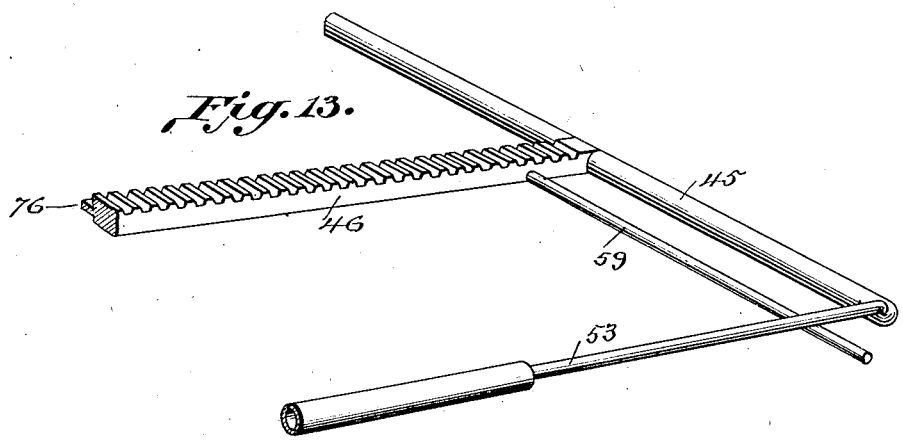
Fig. 13 is a detail perspective view of one of the follower bars and its connections partly broken away.
Figure 4:
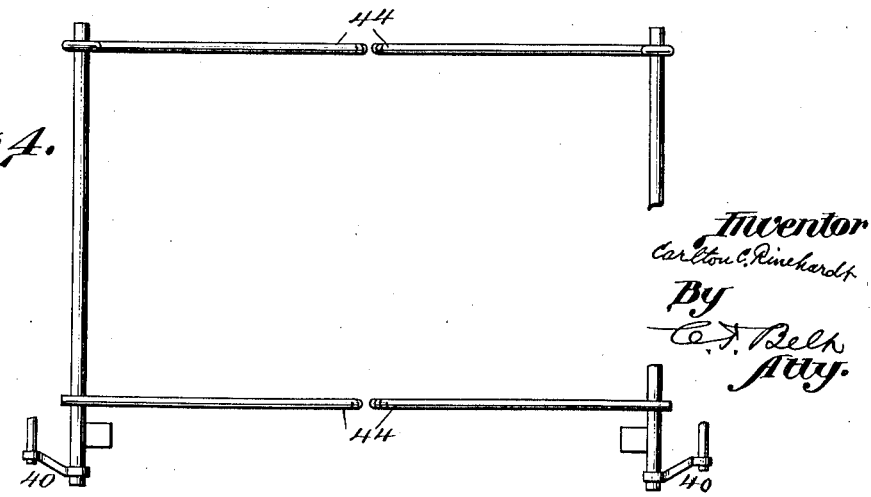
Fig. 4 is a detail elevation of the mechanism for operating the folding bed or table.

It will be seen from the drawings, especially Fig. 2, that certain of the parts of this machine are duplicated, that is to say, the inclined chains and their sprockets, the horizontal conveyer chains and their sprockets, the guides leading to the cutters, the crowding bars, the telescoping rods, the fenders, and certain other parts and devices, are all of the same construction and relative arrangement for simultaneously working two rows of corn; therefore only one set of the same be hereinafter described in detail with their coöperating devices or mechanism.

An upright frame 1, is supported by a main frame comprising longitudinal beams 2, and cross beams 3. One pair of the longitudinal beams 2 being extended forwardly and forming, with beams 4, a supporting frame for the motor 5, and front axle 6, having front wheels 7, and a steering gear 8, operated by the usual hand wheel shaft 9. The front end of the motor frame has a depending fender 10, and the motor has the usual motor-driven shaft 11, geared at 12 with a driving shaft 13, extending crosswise the machine. The shaft 13, is provided at its ends with a beveled pinion 14, and with intermediate beveled pinions 15. The beveled pinions 14 mesh with a gear wheel 16, for driving conveyer chains 20 and 21 respectively, and said chains 20 and 21 work over sprocket wheels 22, and these chains operate a pair of vertical front shafts 17 having top and bottom sprocket wheels 18 and 19 respectively. The intermediate beveled pinions 15 mesh with gear wheels 23, which have sprocket wheels 25 for operating conveyer chains 26 working over sprocket wheels 27, certain of which are arranged to give the chains 26 inclined movement parallel with the chains 20 and 21. A pair of vertical shafts 28 are provided at the rear end of the machine, and sprocket wheels 29 and 30 are secured respectively to the top and to the bottom of the shafts 28, for conveyer chains 31, driven by sprocket wheels 18 and 19, at the top and the bottom respectively, of the shafts 28. All of said chains are provided with conveyer fingers 34 and 35 respectively which coöperate for conveying the corn from the rear of the machine at each side thereof on longitudinal raceways 36 upon which the corn stalks are carried in upright position by the chain fingers from the front of the machine to a rear platform 37, whence the corn or stalks are crowded onto a foldable dropping bed or table comprising a plurality of vanes 38, arranged in two sets, one set for each side of the machine. The vanes 38 are pivoted at the ends and operated in opening and closing movements by a hand lever 39 connected with the vanes by crank levers 40 and connecting rods 41. A center board 42 separates the vane sets, and central longitudinal guide rails 43 are positioned above said board and extend to the rear rails 44 which prevent the corn from dropping or falling out or through the end of the machine, and the rails 43 separate the two bodies of corn and form abutments against which the corn is crowded laterally from the raceways 36. The corn is crowded (by means hereinafter described) with the stalks in upright position against the rails 43 and 44, and against longitudinally movable bars 45 connected with the rear end of a pair of traveling rack bars 46, meshing with a pinion 47 on each end of the shaft 48, driven by the worm 49 of a shaft 50, and the worm meshing with a gear 48$^a$, on the shaft 48, and said shaft 50 is driven by gear and pinion 51 and 52 respectively, geared with the main shaft 11. The gear 51 is slidably mounted on the shaft 50 so as to mesh with a gear 11$^a$ on the shaft 11 for reversing the movement of the shaft 50 and its worm gear 49, for reverse or rearward movement of the racks 46, bars 45, and arms 61. The ends of the bars 45 extend to the raceways 36, and have attached thereto one of the telescoping rods 53, the end member 53$^a$ of these rods being slidable through a fixed collar 54, having a front guide bar 55. In order to provide for the gradual movement of the corn or stalks, in upright position, from the raceways 36 laterally and forwardly to the dropping table according to the forward movement of the bar 45, during a continuous corn cutting operation, that is without stopping the machine in its cutting and feeding of the corn to the raceways, I have devised, in connection and coöperation with the traveling racks 46 and telescoping rods 53, a corn crowding device comprising upper and lower bars 56 and 57 respectively, which are connected rigidly together by uprights 58. One end of the bars 56 and 57 is free for working through the rear end of the machine, and the other or forward portions of these bars is bent outwardly and forms an angle arm 61, which extends diagonally across the raceways and in the path of movement of the corn as it is carried by the chain fingers 35 along the raceways 36 against the telescoping rods 53. The end of the bent portion of the crowder bars 56 and 57 is rigidly connected with the rear end of the rack bars 46 by means of an arm 59 extending under the raceways. The crowder bars are guided and supported in longitudinal line with the telescoping rods by means of a bearing 60 secured to and projecting upwardly from the upright frame. The angle arm 61, of the crowder bars being permanently fixed with respect to the bar 45, the arm 54, and the telescoping guide, the passageway for the corn to the dropping table remains the same during the whole length of travel of the bar 45, so that the corn is delivered on to the table behind said bar 45 as the latter is moved forward by means of the rack bars 46, operated by their gears and shafts. When the bar 45 and the crowder arm 61 shall have reached the limit of forward movement, the crowder arm 61 will force the incoming corn upon a stand or support 62 at the forward end of the raceways while the shocked corn is being tied and dropped to the ground by operating the table vanes into open and closed positions; then the bar 45 is returned to rearward position for forming further shocks on said table. These operations are continuous during continuous motor movement of the machine without interrupting corn cutting. The mechanism for assembling the corn on the table, beginning at the rear end thereof, and working the corn in shock condition from the rear of the table to the front end thereof without permitting any corn to pass on to the table while the follower bar 45 and its crowder bars are at the limit of forward movement, is one of the important features of this invention, as said mechanism affords means for controlling the movement of the corn to the table according to the forward movement of said bars, so that, as the corn is carried rearwardly by the chain fingers to the angle arm 61 of the crowder bars, the latter force the corn upon the table and between the end rails 44 and the follower bar 45, and continue to do so during the forward movement of said bars until the latter reach their limit of forward movement, whereupon the crowder bars force the corn from the chain fingers to the stand or support 62, and this corn, then temporarily held upon the support 62 during the dropping of the shocked corn, is carried to the rear of the table by the backward movement of the bar 45.

The cutter bar 63 is slidably mounted on the forward beam 3, and has a cutting knife 64 secured adjacent to each end. The bar 63 is reciprocated by an eccentric rod 65 operated by gear and pinion connected with the main shaft 11. The knives 64 are reciprocated by the bar 63, across a corn space or passage formed by a pair of outwardly flaring guides 67.

The corn gathering chains 68 are operated in an inclined guide frame 69, by means of sprocket wheels 70 and a central sprocket wheel having a pinion 72 meshing with a beveled gear 73 on the upper end of a vertical shaft 74. It will be understood that a shaft 74 is provided for each of the chains 68, and said shafts are operated by the sprocket chains 20 and 26 respectively.

The outer side of the beams 4 is provided with a channel 75 in which the rack bars 46 are operated in their movement forward of the rack-engaging pinions 47, and the rack bars 46 have a side flange 76 fitting the channel 75. Obviously the worm gear mechanism, the gears of the main shaft 13, and other gears may be inclosed or partly so for protection, and to avoid interference. The corn gathering chains may also be partly inclosed.

The cross beams as 3 are extended from the sides of the beams 2, and the projecting ends have secured thereto longitudinal side beams 77 upon the outside of the traction wheels. The rear traction wheels 80 are located in the space between the beams 77 and the frame beams 2, and said wheels are provided with a sprocket wheel 81, worked by a sprocket chain 82 driven by a sprocket wheel 83 on the ends of the cross shaft 13. In order to afford means for mounting the traction wheels 80 and for varying the distance between the main frame of the machine and the surface of the ground, I provide coöperating brackets 84 84ª and 85. The brackets 84 and 84ª are secured to and depend from the beams 77, and the brackets 85 are secured to and depend from the beams 2. The brackets 84 have a toothed rack 86 for a pinion 87 secured to the outer end of the axles 88 of the wheels 80, and the other end of said axles has a pinion 89 working in a toothed rack 90 on one of the brackets 85. A worm 91 is mounted in vertical position on the brackets 84ª, and meshes with the pinion 87, and is provided with a suitable head as 93 to which may be applied a suitable wrench or other implement for turning the worm, so as to raise or lower the wheel axles and thereby change the vertical position of the main frame as desired or as occasion may demand.

The fender 10 is adapted to gather up loose stalks and blades so as to clear the way between the rows of corn for the machine.

A fender 94 depends from and is supported by the beams 2 for deflecting or pressing down the stubble stalks which are left standing after the cutting operation.

In operation, the inclined chains 68 being driven faster than the chains 20 and 26, so as to have these chain fingers keep the corn in upright position, the chains 31 take the corn from the chains 20 and 26 and carry it rearwardly on the race-ways 36 to the crowding bars 61, the telescoping rods 53 hold the corn in upright position during said movement of the race-ways, whence the corn is crowded by way of the platforms 37 on to the corn dropping bed vanes 38, and during the crowding of the corn upon the bed vanes and between the bars 44 and 45 and the rails 43, the bars 45 are moving forward so as to permit two shocks of corn to be formed on the bed vanes, and against the centrally fixed rails 43, where the shocks are hand-tied and then dropped by operating the vanes to open the bed. Upon closing the vanes, the mechanism for operating the rack bars 46 is reversed so as to return the arms 45 to rear position for the next shocking operation. The machine continues the corn cutting during said operations, and while the vanes are being opened and closed and during the shifting of gear 51 for reversing the shaft 50 the corn is temporarily crowded onto the stands 62 back of the bars 45 by the crowding arms 61, so as not to be engaged by the corn-carrier fingers 35 until the crowding arms 61 are moved rearwardly by the rearward movement of the follower bars 45, whereupon the fingers 35 carry the corn from the stand 62 along the raceways for another shocking operation, as hereinbefore described. The bars 44 are opened by hand levers 40 after the shocks are dropped to the ground in standing position, or simultaneously with said dropping, so as to permit the bars 44 to pass clear of the shocks during continued forward movement of the machine, and said bars 44 are closed immediately after passing the deposited shocks.

It will be seen that the various mechanisms, with the exception of the table vanes, are all operated with power transmitted from the main shaft 11, and that the operation of said mechanisms is continuous during the travel of the machine, so that the corn is operated upon continuously during the travel of the machine, without the necessity of stopping the machine or any of the said mechanisms, in perfecting the gathering, feeding, cutting, conveying, shocking, and dropping of the corn in shocked condition between the rows from which the corn is cut.

It will be understood that the stands or platforms 62 are stationary at the forward end of the bed and are preferably flush with the entrance or forward end of the raceways, and by reason of the bars 45 and the arms 61 being rigidly connected the space between the ends of said bars and the said arms is always the same, and that while the bed vanes are open said bars and arms are in forward position partly over said stands, and in this position the arms guide the corn from the forward end of the raceways on to the platforms and against the bars, but by the time the vanes are closed the bars are given reverse or rearward movement which moves the corn from the stands onto the bed. Obviously, while the corn is on the stands it is held out of engagement with the traveling chain fingers.

Obviously many mechanical changes and variations will be developed in the manufacture of this machine, and various modifications may be resorted to in the practical application of the various individual features herein shown and described; therefore I do not wish to be understood as confining myself to any particular sizes, materials, or to the particular gearing and other means shown and described for transmitting power for operating the various improved and novel features of the machine.

And I further do not wish to be understood as confining my invention to any particular shape and arrangement of the machine, but reserve the right to employ such power transmission for the operation of my improvements, and to make such changes and variations in the various parts for perfecting the operation of the same, as may be in keeping with the invention disclosed herein.

Having thus described my invention what I claim as new and desire to secure by Letters Patent is:—

1. In a corn harvesting machine, the combination of a corn-supporting bed adapted to be opened and closed, stationary raceways at the sides of the bed, stationary platforms at the forward end of the bed and adjacent to the corn entrance end of the raceways, means for conveying the corn to the raceways, and means for guiding the corn onto the platforms and holding it there while the bed is open.

2. In a motor driven corn harvesting machine, the combination with a shocking table, a raceway at each side of the table, and conveyer chains operated at one side of the raceways, of mechanism for shocking corn on the table comprising follower bars extending across the table, rack bars to which the follower bars are attached, telescoping rods one of which is attached to the follower bar, corn crowding bars, arms rigidly connecting the crowding bars with the rack bars, and means operating the rack bars for sliding the said follower bars lengthwise the table in a shocking operation.

3. In a motor driven corn harvesting machine, the combination with a shocking table, a raceway at each side of the table, and conveyer chains operated at one side of the raceways, of mechanism for shocking corn on the table comprising a follower bar extending across the table, longitudinal rack bars having one end attached to the follower bar, telescoping rods parallel with the rack bars and having one of said rods attached to the ends of the follower bar, said rods forming a movable corn guide at the other side of the raceways, corn crowding bars working in alinement with the telescoping rods and having an angle end extending across the raceways, an arm rigidly connecting the angle end with the rack bars, and means operating the rack bars for sliding the follower bar over the table in a shocking operation.

4. In a motor driven corn harvesting machine, the combination with a shocking table, a raceway at each side of the table, and conveyer chains operated at one side of the raceways, of mechanism for shocking corn on the table comprising a follower bar extending across the table, longitudinal rack bars having one end attached to the follower bar, telescoping rods parallel with the rack bars and having one of said rods attached to the ends of the follower bar, said rods forming a movable corn guide at the other side of the raceways, corn crowding bars working in alinement with the telescoping rods and having an angle end extending across the raceways, an arm rigidly connecting the angle end with the rack bars, and means for operating the rack bars comprising a shaft having pinions meshing with the rack bars, a gear on the shaft, a worm shaft, and mechanism for transmitting power from the motor to the worm shaft.

5. In a motor driven corn harvesting machine, a longitudinal motor shaft, a cross shaft driven by the motor shaft, top and bottom conveyer chains for carrying corn from the front to the rear of the machine, mechanism for transmitting power from the cross shaft to the said chains, a shock dropping table, a raceway at each side of the table, follower bars extending across the table, mechanism transmitting power from the motor shaft to said bars for sliding them lengthwise over the table, rails upon the rear end of the machine, longitudinal rails central of the machine, and corn crowding bars working through the end rails and rigidly connected with the follower bars for continuously shocking the corn upon the table against said rails and the follower bars during forward movement of the follower bars.

6. In shocking mechanism for corn harvesters, the combination with a shocking bed, and corn raceways paralleling the sides of the bed, of a reciprocating bar, means for reciprocating the bar over and lengthwise the bed, telescoping rods forming lateral supports for the corn on the raceways and having a fixed member and a member attached to the ends of said bar, and a corn crowding arm connected with each end of said bar so as to leave a corn passage between the arms and the ends of the bar, said arms being moved over the raceway by the movement of said bar for guiding corn from the raceways to the bed, in a corn shocking operation.

7. In shocking mechanism for corn harvesters, the combination with a shocking bed, and corn raceways parallel with the sides of the bed, of corn supporting stands at the forward end of the raceways, a reciprocating bar, means for reciprocating the bar lengthwise the bed, telescoping rods attached to the ends of the bar and forming a lateral support for the corn on the raceways, and a corn crowding arm extending across the raceways and connected with each end of the bar so as to leave a corn passage between the ends of the bar and the arms, said arms being moved over the raceways by the movement of said bar for guiding corn from the raceways to the bed and for crowding the corn on to the stands with the said bar and rods in contracted position.

8. The combination with a corn shocking table, a corn raceway at each side of the table, follower bars working over the table, means for retracting the follower bars, and a corn conveyer chain working over the raceways, of telescoping corn guards attached to and operated by the follower bars parallel with the said chains, and corn crowding bars rigidly connected with the follower bars and having an arm extending across the raceways at the ends of the follower bars for guiding the corn from the raceways on to the table and to the rear of the follower bars during the forward movement of the latter.

In witness whereof I hereunto set my hand in the presence of two witnesses.

CARLTON C. RINEHARDT.

Witnesses:
 GEO. J. SLALINE,
 MARY B. CAREY.